April 1, 1958     C. F. BROWNFIELD     2,828,890
CONSTRUCTION OF CAN AND DISPENSER
Original Filed Dec. 7, 1956
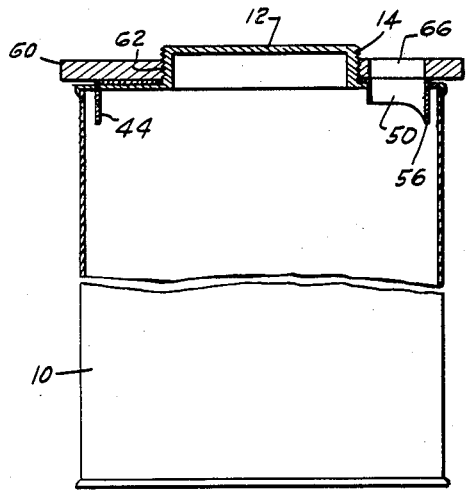
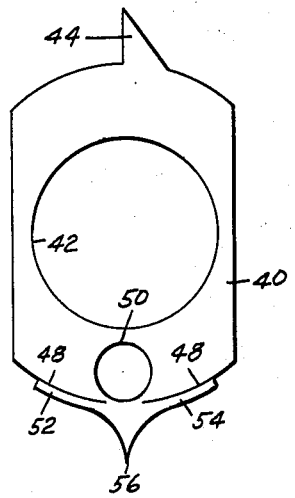
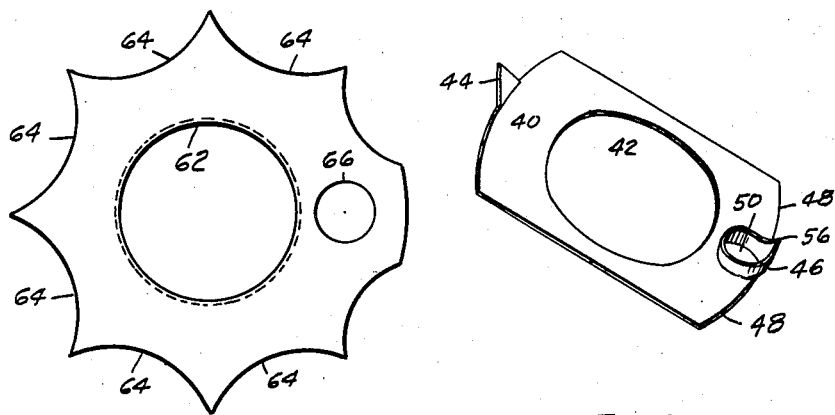
INVENTOR.
CHARLES F. BROWNFIELD
BY
Harry H. Hitzeman
ATTORNEY United States Patent Office 2,828,890
Patented Apr. 1, 1958

2,828,890
CONSTRUCTION OF CAN AND DISPENSER

Charles F. Brownfield, Chicago, Ill.

Original application December 7, 1956, Serial No. 626,942, now Patent No. 2,801,464, dated August 6, 1957. Divided and this application June 17, 1957, Serial No. 665,959

3 Claims. (Cl. 222—83)

My invention relates to improvements in the construction of cans or containers and openers therefor.

My invention relates more particularly to the type of container that must be cut open to permit access to the product therein, and more specifically to a container of this type that is provided with a top cap which is formed with exterior threads.

A further object of the invention is to provide a cutting unit of the type described which may also have as a feature thereof a cutting member capable of producing a small round opening for pouring or drinking and an air entrance opening opposite thereto.

This application is a division of my co-pending application for patent on "Construction of Can and Opener", Serial No. 626,942, filed December 7, 1956, which issued as Letters Patent No. 2,801,464 on August 6, 1957, and relates specifically to the construction shown therein in Figs. 6, 7, 8 and 9 thereof.

Other objects and advantages will be more apparent from the following description wherein reference is had to the accompanying drawings, upon which:

Fig. 1 is a side elevational view of a container partially in cross-section and showing the cutter member and follower in cross-section thereon;

Fig. 2 is a plan view of a cutter showing the same as it has been stamped from a blank of sheet metal;

Fig. 3 is a perspective view thereof showing the same formed to provide the hole cutting and slit cutting knives thereon;

Fig. 4 is a plan view of the cutter follower which may be used in connection with the cutter shown in Fig. 2; and Fig. 5 is a side elevational view thereof.

In the embodiment of the invention which I have chosen to illustrate and describe the same, in Fig. 1 I have shown a cylindrical container 10 which may be metal, plastic or any other suitable or desirable material that is capable of being cut by a metal cutter member.

The container 10 is formed with a top cap portion 12 provided with exterior threads 14 on the same. The cutter unit may comprise two pieces, a follower member 60 that is comparatively rigid and provided with arcuate grooves 64 for easy gripping to turn the same. It is also provided with a medially disposed tapped opening 62 which can be screw-threadedly mounted on the exterior threads 14 of the cap 12 of the container 10.

I have provided a cutter member 40 which is especially adapted for use in opening cans or containers that contain liquids that may be drunk from the can if desired. Accordingly the member 40 is provided with a medial opening 42 to fit over the screw-threaded top 12 of the can. A triangularly shaped knife blade 44 is provided at one side and a comparatively circular pointed blade member 46 at the other. The circular knife 46 is made from the blank shown in Fig. 2, the metal being slit along the lines 48 as shown, and the opening 50 also being punched in the blank while flat.

The portions 52 and 54 terminate in a sharp point 56 and this portion of the blank may be bent at right angles to the plane shown in Fig. 2, the metal bent around to form a circle around the opening 50, and a piercing knife has been provided that will cut a round hole in the top of the can so that liquid may either be poured out of the hole or it may be drunk from the same.

The cutter follower may consist of a flat blank 60 which has a screw-threaded medial opening 62 therein adapted to mesh with the threads 14 on the top of the container 10. I also provide the sector shaped peripheral walls 64 for easy gripping to rotate the follower. An opening 66 is provided through the follower 60 which, when the cutter has been turned down to puncture a round opening through the top of the can, can be swung around to overlie the opening so that liquid may be drunk through the same.

From the above and foregoing description it can be seen that I have provided a unit for piercing and cutting a round hole in the top of containers simply and expeditiously, a unit that is easily operated due to the pressure that can be obtained by simply rotating the follower 60 on the threads of the top of the can to easily effect the cutting operation.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. A unit for cutting the top from a sealed container that has a cap with exterior threads thereon, said unit comprising a cutter member having an opening to fit over said cap, said cutter member also having a pointed blade portion formed on its side and a circular cutter and point on the other side, a flat follower having a tapped medial opening adapted to engage the threads on the cap and force the blade portions of the cutter member through the top of the container and by continued rotation of the follower cut a slotted opening in one side of the top of the container and a round hole in the other side.

2. A unit for cutting the top from a sealed container that has a cap with exterior threads thereon, said unit comprising a cutter member having an opening to fit over said cap, said cutter member also having a pointed blade portion formed on its side and a circular cutter and point on the other side, a flat follower having a tapped medial opening adapted to engage the threads on the cap and force the blade portions of the cutter member through the top of the container and by continued rotation of the follower cut a slotted opening in one side of the top of the container and a round hole in the other side, said follower having a periphery including grooves and ridges for easy turning.

3. A unit for cutting the top from a sealed container that has a cap with exterior threads thereon, said unit comprising a cutter member having an opening to fit over said cap, said cutter member also having a pointed blade portion formed on its side and a circular cutter and point on the other side, a flat follower having a tapped medial opening adapted to engage the threads on the cap and force the blade portions of the cutter member through the top of the container and by continued rotation of the follower cut a slotted opening in one side of the top of the container and a round hole in the other side, said follower having a periphery including grooves and ridges for easy turning, said cutter member being formed from a flat blank with the pointed blade portion and the circular cutter bent up at right angles from the body of the cutter member.

No references cited.